US009956827B2

(12) United States Patent
Orlowski

(10) Patent No.: US 9,956,827 B2
(45) Date of Patent: May 1, 2018

(54) AGRICULTURAL VEHICLE TIRE CARCASS REINFORCEMENT

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: Claude Orlowski, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 700 days.

(21) Appl. No.: 14/411,858

(22) PCT Filed: Jun. 26, 2013

(86) PCT No.: PCT/EP2013/063359
§ 371 (c)(1),
(2) Date: Dec. 29, 2014

(87) PCT Pub. No.: WO2014/001378
PCT Pub. Date: Jan. 3, 2014

(65) Prior Publication Data

US 2015/0165832 A1 Jun. 18, 2015

(30) Foreign Application Priority Data

Jun. 28, 2012 (FR) ..................................... 12 56153

(51) Int. Cl.
*B60C 15/00* (2006.01)
*B60C 3/04* (2006.01)

(52) U.S. Cl.
CPC ............ *B60C 15/0018* (2013.01); *B60C 3/04* (2013.01); *B60C 15/0036* (2013.01); *B60C 2015/009* (2013.01); *B60C 2200/08* (2013.01)

(58) Field of Classification Search
CPC ............ B60C 15/0009; B60C 15/0018; B60C 15/0036; B60C 15/0045; B60C 15/0054; B60C 2015/009
See application file for complete search history.

(56) References Cited

U.S. PATENT DOCUMENTS 4,086,948 A * 5/1978 Suzuki ...................... B60C 9/08 152/541
4,887,655 A * 12/1989 Imai ...................... B60C 9/2009 152/531

(Continued)

FOREIGN PATENT DOCUMENTS

DE 198 45 724 4/2000
EP 1 013 482 6/2000

(Continued)

OTHER PUBLICATIONS

Machine Translation: JP-06344713-A; Oda, Keishiro; no date.*
Machine Translation: JP-08244403-A; Kojima, Hiroshi; (Year: 2017).*

*Primary Examiner* — Michael H. Wilson
*Assistant Examiner* — Kendra Ly
(74) *Attorney, Agent, or Firm* — Cozen O'Connor

(57) ABSTRACT

Tire comprising carcass reinforcement (7) comprising turned-up carcass layers (71, 72) and non-turned-up carcass layers (73, 74), each turned-up carcass layer (71, 72) comprising main part (711, 721) wrapped, in each bead (4), from the inside of the tire towards the outside around bead wire (8) of diameter D, to form turn-up (712, 722) of which end (E1, E2) is positioned radially on the outside of radially outermost point E of bead wire (8) at a radial distance (a1, (Continued)

a2), each non-turned-up carcass layer (73, 74) having an end (E3, E4) which is positioned at radial distance (b3, b4) from the radially outermost point of E of bead wire (8), the radial distance (a1, a2) is at least equal to 0.5 times the section height H of the tire and the radial distance (b3, b4) is at most equal to diameter D of bead wire (8).

11 Claims, 2 Drawing Sheets

(56) References Cited

U.S. PATENT DOCUMENTS

| | | | | | |
|---|---|---|---|---|---|
| 5,058,646 | A * | 10/1991 | Kajikawa | B60C 3/04 152/454 |
| 5,988,247 | A * | 11/1999 | Tanaka | B60C 9/18 152/517 |
| 2004/0055689 | A1 | 3/2004 | Suzuki | |
| 2005/0016653 | A1* | 1/2005 | Kajita | B60C 9/08 152/451 |
| 2006/0124215 | A1 | 6/2006 | Vu et al. | |
| 2008/0006359 | A1 | 1/2008 | Yamashita | |
| 2008/0066845 | A1* | 3/2008 | Shiraishi | B60C 1/00 152/454 |

FOREIGN PATENT DOCUMENTS

| | | | | |
|---|---|---|---|---|
| GB | 2 092 964 | | 8/1982 | |
| JP | 06344713 | A * | 12/1994 | |
| JP | 08244403 | A * | 9/1996 | B60C 15/0018 |

* cited by examiner

AGRICULTURAL VEHICLE TIRE CARCASS REINFORCEMENT

RELATED APPLICATIONS

This is a U.S. National stage of International application No. PCT/EP2013/063359 filed on Jun. 26, 2013.

This patent application claims the priority of French application no. 1256153 filed Jun. 28, 2012 the disclosure content of which is hereby incorporated by reference.

FIELD OF THE INVENTION

The present invention relates to a radial tire for a heavy vehicle intended to run on various types of ground, such as a vehicle of the agricultural or construction plant type.

Although not restricted to this type of application, the invention will be described more particularly with reference to a radial tire that is intended to be mounted on a self-propelled agricultural vehicle such as a combine harvester or a spreader.

BACKGROUND OF THE INVENTION

In the following text, the circumferential, axial and radial directions respectively denote a direction tangential to the tread surface of the tire in the direction of rotation of the tire, a direction parallel to the rotation axis of the tire and a direction perpendicular to the rotation axis of the tire. "Radially on the inside or, respectively, radially on the outside" means "closer to or, respectively, further away from the rotation axis of the tire". "Axially on the inside or, respectively, axially on the outside" means "closer to or, respectively, further away from the equatorial plane of the tire", the equatorial plane of the tire been the plane passing through the middle of the tread surface of the tire and perpendicular to the rotation axis of the tire.

A tire comprises a tread which is intended to come into contact with the ground by way of the tread surface and is connected by way of two sidewalls to two beads that provide the mechanical connection between the tire and the rim on which it is mounted.

A radial tire also comprises a reinforcement, comprising a crown reinforcement, radially on the inside of the tread, and a carcass reinforcement, radially on the inside of the crown reinforcement.

The carcass reinforcement of a radial tire for a heavy vehicle of the agricultural type generally comprises at least one carcass layer consisting of very often textile reinforcing elements that are coated with a polymeric material of the elastomer type.

A carcass layer is referred to as turned-up when it comprises a main part that connects the two beads together and is wrapped, in each bead, from the inside of the tire to the outside around a circumferential reinforcing element which is very often metallic and coated in at least one generally elastomeric or textile material, so as to form a turn-up having a free end. The assembly formed by the circumferential reinforcing element and its coating material is usually known as a bead wire.

In the case of a turned-up carcass layer, the turn-up, in each bead, allows the turned-up carcass layer to be anchored to the bead wire. The portion of bead wire in contact with the turned-up carcass layer contributes, in particular upon inflation, to reacting tensile forces in the turned-up carcass layer by coupling. This contribution to reacting tensile forces depends on the torsional stiffness of the bead wire and on the geometry of the turn-up. In the usual case of high torsional stiffness of the bead wire, the tensile forces upon inflation are essentially reacted by the bead wire, with a secondary contribution by the turn-up. In the case of lower torsional stiffness of the bead wire, the tensile forces are reacted both by coupling to the bead wire and by shearing between the turn-up and the materials adjacent thereto, this requiring a sufficiently long turn-up that is to say one in which the end is sufficiently far away radially from the radially outermost point of the bead wire.

A carcass layer is referred to as non-turned-up when it consists only of a main part that connects the two beads together without being wrapped around a bead wire.

In the case of a non-turned-up carcass layer, each of the two end portions of said non-turned-up carcass layer may be coupled either to the turn-up of at least one turned-up carcass layer or to the main part of at least one turned-up carcass layer. Coupling means a region of overlap between the non-turned-up carcass layer and a turned-up carcass layer, allowing tensile forces to be reacted by shearing. In the case of a carcass reinforcement comprising two turned-up carcass layers and at least one non-turned-up carcass layer, each end of a non-turned-up carcass layer may be interposed between the respective turn-ups of two turned-up carcass layers, that is to say it has, on each of its axial faces, a region of overlap with a turned-up carcass layer turn-up.

The reinforcing elements of the main part of a turned-up or non-turned-up carcass layer are approximately parallel to one another and form, with the circumferential direction, an angle of between 85° and 95°. The reinforcing elements of a turn-up of a turned-up carcass layer form an angle, with respect to the circumferential direction, of between 75° and 105°.

A tire for a self-propelled agricultural vehicle, being designed for a recommended load, is conventionally inflated to a recommended inflation pressure of between 2.4 and 3.2 bar. The recommended loads and inflation pressures, for a given tire dimension, are defined for example by the European Tire and Rim Organization (ETRTO) standard.

A tire for a self-propelled agricultural vehicle is referred to as having high bending when it has a loading capacity at least equal to 1.2 times the loading capacity recommended for a standard-technology tire of the same size, known as a reference tire, for a pressure equal to the pressure of the reference tire. It allows three types of use: under overload with respect to the standard-technology tire, or at under-pressure with respect to the standard-technology tire, or with any intermediate combination. The advantage of use under overload is that the productivity of harvesting operations with the agricultural vehicle is increased. The advantage of use at under-pressure is that the compaction of the ground and damage to crops as the agricultural vehicle passes is decreased. Under these use conditions with high bending, it has been found that the mechanical endurance of the carcass reinforcement is substantially reduced compared with use under a load equal to the recommended load combined with an inflation pressure equal to the recommended inflation pressure.

The bending of a tire is commonly characterized by a relative deflection, defined as the ratio in the variation of the radial height of the meridian section of the tire to half the difference between the outside diameter of the tire and the maximum diameter of the rim measured on the rim flange when the tire passes from an unladen inflated state to a laden inflated state. The outside diameter of the tire is measured statically in an unladen inflated state.

The document WO2004106089 describes a tire for an agricultural vehicle of the tractor type that operates with high bending, characterized by a high deflection, greater than 28%, resulting from use at a reduced inflation pressure compared with the recommended inflation pressure, in order to reduce the compaction of the ground and damage to the crops as the agricultural machine passes. According to the invention, the tire is such that the aspect ratio H/S of the height H of the tire to the maximum axial width S of the tire is less than 0.75 and the ratio A/B of the tread width A to the deflection height B of the crown is greater than 17. This document shows that an appropriate choice of the geometry of the tire thus allows use with high bending.

However, such a solution is difficult to apply to a tire for a self-propelled agricultural vehicle of which the geometric dimensions cannot necessarily be adapted as recommended in the document WO2004106089.

Moreover, a tire for a self-propelled agricultural vehicle is essentially designed to have a high loading capacity, whereas a tire for a vehicle of the tractor type, as described in the document WO2004106089, is designed to be able to transmit a high tractive torque to the rim. Since the respective uses of these two types of tires are thus different, the design, and in particular the geometric characteristics, are not easily transposable from a tire for a vehicle of the tractor type to a tire for a self-propelled agricultural vehicle.

Consequently, an alternative solution is necessary to solve the problem of using a tire for a self-propelled agricultural vehicle having high bending.

SUMMARY OF THE INVENTION

One object of the invention is to improve the endurance of the carcass reinforcement of a tire for a self-propelled agricultural vehicle when the tire is subjected to high bending.

This and other objects are attained in accordance with one aspect of the present invention directed to a tire for a heavy vehicle of the self-propelled agricultural type, comprising:

a tread, of width A, connected by way of two sidewalls to two beads intended to provide a mechanical connection to a rim, of width L, a reinforcement comprising a crown reinforcement, radially on the inside of the tread, and a carcass reinforcement, radially on the inside of the crown reinforcement, the carcass reinforcement comprising at least two turned-up carcass layers and at least two non-turned-up carcass layers, each turned-up carcass layer consisting of mutually parallel reinforcing elements and comprising a main part wrapped, in each bead, from the inside of the tire towards the outside around a bead wire of diameter D, so as to form a turn-up of which the end is positioned radially on the outside of the radially outermost point of the bead wire at a radial distance, each non-turned-up carcass layer consisting of mutually parallel reinforcing elements, the end of which is positioned at a radial distance from the radially outermost point of the bead wire, the meridian section of the tire having, in a meridian plane passing through the rotation axis of the tire, a section height H and a section width S, the radial distance between the end of the turn-up of each turned-up carcass layer and the radially outermost point of the bead wire being at least equal to 0.5 times the section height H of the tire, and the radial distance between the end of each non-turned-up carcass layer and the radially outermost point of the bead wire being at most equal to the diameter D of the bead wire.

The ETRTO standards specify a number of features as regards the tires for an agricultural vehicle. A tire for a self-propelled agricultural vehicle is intended to be mounted on a rim having a diameter at least equal to 24 inches. Its theoretical aspect ratio H/S between the theoretical section height H, referred to as section height H, and the design or theoretical section width S, referred to as section width S, is currently between 0.60 and 0.85, in a non-limiting manner. Such a tire is intended to be inflated to a recommended inflation pressure at most equal to 2.4 bar, depending on its size and its use.

A radial distance between the end of the turn-up of each turned-up carcass layer and the radially outermost point of the bead wire at least equal to 0.5 times the section height H of the tire entails a long turn-up. The end of a long turn-up is thus positioned outside the middle part of the sidewall, which is a highly curved bending region. The mechanical stresses at the end of the turn-up are thus limited, thereby improving the endurance at the end of the turn-up.

A long turn-up, present over the entire height of the sidewall, also contributes to the structural stiffness of the tire. This increase in the structural stiffness, due to the presence of the turn-up over the entire height of the sidewall, also helps to improve the endurance of the carcass reinforcement in the case of high bending.

A radial distance between the end of each non-turned-up carcass layer and the radially outermost point of the bead wire at most equal to the diameter D of the bead wire means that the end of the non-turned-up layer is close to the bead wire. The diameter D of the bead wire is the diameter of the circle circumscribed around the meridian section of the bead wire. In practice, the end of the non-turned-up carcass layer is positioned radially on the outside of the radially outermost point of the bead wire, that is to say of the radially outermost point of the circle circumscribed around the meridian section of the bead wire. Taking manufacturing tolerances into account, this end may also be positioned radially on the inside of the radially outermost point of the bead wire. In any case, the radial distance between the end of the non-turned-up carcass layer and the radially outermost point of the bead wire should have a maximum value at most equal to the diameter D.

Positioning the end of the non-turned-up layer approximately at the radially outermost point of the bead wire allows the end to be positioned outside the bending region of the bead on the rim and outside the region of tight clamping of the bead against the rim, in which regions the end of the non-turned-up carcass layer would be subjected to high mechanical stresses that are disadvantageous in terms of endurance.

Positioning the end of the non-turned-up layer approximately at the radially outermost point of the bead wire also allows said non-turned-up layer to be present over the entire height of the sidewall and thus to contribute to the structural stiffness of the tire. This increase in the structural stiffness, due to the presence of the non-turned-up layer, also helps to improve the endurance of the carcass reinforcement in the case of high bending.

The radial distance between the end of the turn-up of each turned-up carcass layer and the radially outermost point of the bead wire is advantageously at most equal to 0.85 times the section height H of the tire. This feature means that the end of the turn-up is positioned outside the crown region and that the turn-up is not involved in the mechanical operation of the crown reinforcement.

The at least two non-turned-up carcass layers of the carcass reinforcement are advantageously axially on the outside, at the sidewalls, of the main parts of the two turned-up carcass layers. This configuration allows easier assembly of the carcass reinforcement layers during production.

It is advantageous for the end of the axially outermost non-turned-up carcass layer to be interposed between the respective turn-ups of two turned-up carcass layers. Such a configuration brings about mechanical coupling on the two faces of the non-turned-up carcass layer to the respective adjacent turn-ups of the two turned-up carcasses, thereby increasing the structural stiffness of the tire and thus improving its endurance.

It is also advantageous for the end of the axially innermost non-turned-up carcass layer to be axially on the inside of the respective turn-ups of two turned-up carcass layers.

A particularly advantageous configuration is one in which a first, axially outermost non-turned-up layer has an end interposed between the respective turn-ups of the two turned-up layers, and in which a second, axially innermost non-turned-up layer has an end axially on the inside of the respective turn-ups of two turned-up carcass layers and of the bead wire. In this case, the neutral axis of the bead, like a beam in bending, passes approximately through the middle of the bead. This causes, in the bead, an approximately symmetrical distribution of the bending stresses between the axially innermost carcass reinforcement portion and the axially outermost carcass reinforcement portion. The axially innermost carcass reinforcement portion is formed by the main parts of the two turned-up carcasses and the second, axially innermost non-turned-up carcass layer. The axially outermost carcass reinforcement portion is formed by the turn-ups of the two turned-up carcasses and the first, axially outermost non-turned-up carcass layer.

The reinforcing elements of a carcass layer of an agricultural tire are generally made of textile. This is because textile is an economical material that is well-suited to the tire building process.

The reinforcing elements of a carcass layer of an agricultural tire are advantageously made of polyester. This is because polyester is a textile material which exhibits an advantageous compromise between its mechanical properties and its cost.

The meridian section of the tire having a crown deflection B, the tread width A is advantageously at most equal to 20 times the crown deflection B, preferably at most equal to 16 times the crown deflection B.

The crown deflection B is defined as the radial distance between the radially outermost point on the tread surface, positioned in the equatorial plane of the tire, and the axial end points of the tread surface, this radial distance usually being measured on a meridian cross section of the tire. The tread width A is defined as the axial distance between the axial end points of the tread surface, which are the points of last contact of the tread surface with flat ground when the tire, inflated to its recommended inflation pressure, is compressed under a load equal to the recommended load. This tread width can be measured on an inked impression of the tire, subjected to the recommended pressure and load, and is defined by the width of this inked impression.

This feature of the ratio between the tread width A and the crown deflection B conditions the meridian curvature of the tread surface. Optimization of the meridian curvature of the tread surface ensures distribution of the pressures on the ground, limiting the compaction of the ground, and satisfactory drivability in the field. This meridian curvature is optimized with regard to the design of the crown reinforcement, and in particular to the nature of the constituent material of the reinforcement element layers of the crown layers, which are generally metal for a self-propelled agricultural vehicle tire.

It is also advantageous for the tread width A to be at least equal to 10 times the crown deflection B. A minimum value of this feature makes it possible to obtain a meridian profile of the tread surface that is sufficiently flat to ensure distribution of the pressures on the ground, limiting the compaction of the ground, and satisfactory wear.

The section width S of the tire is advantageously at most equal to 1.4 times the rim width L. As seen above, the section width S of the tire is defined as the design or theoretical section width within the meaning of the ETRTO standard. The rim width L is also defined by the ETRTO standard. This feature entails a section that is not too wide, with respect to the rim, so as to ensure sufficient radial stiffness of the sidewall.

It is also advantageous for the section width S of the tire to be at least equal to 1.1 times the rim width L. This feature entails a section that is sufficiently wide, with respect to the rim, to ensure the bending of each sidewall, towards the outside of the tire, without the risk of mechanical instability or buckling.

The tread width A is advantageously at most equal to 0.95 times the section width S of the tire. A maximum tread width, with respect to the tire section width, ensures bending of each sidewall without the risk of mechanical instability or buckling, and consequently an improved bending capacity in the event of overload.

Finally, it is advantageous for the tread width A to be at least equal to 0.75 times the section width S of the tire. This minimum tread width ensures a tread volume with minimum wear, necessary for achieving the objective of useful life in terms of wear of the tire.

BRIEF DESCRIPTION OF THE DRAWINGS

The features of the invention will be understood better with the aid of FIGS. 1 and 2.

DETAILED DESCRIPTION OF THE DRAWINGS

Figure 1:
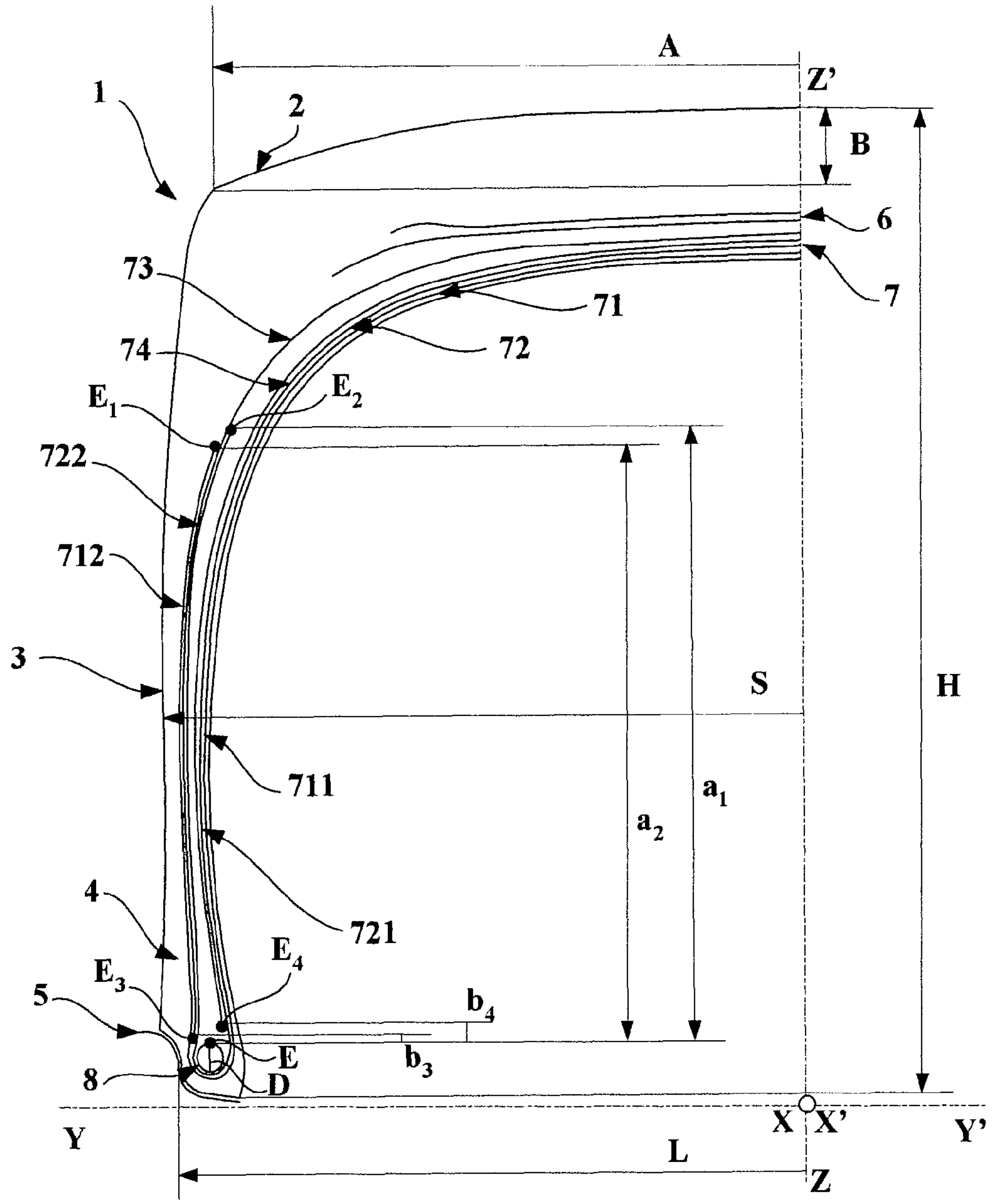
FIG. 1 shows a meridian half-section through a tire for a self-propelled agricultural vehicle according to an embodiment of the invention.

FIG. 1 shows a meridian half-section through a tire 1 for a heavy vehicle of the self-propelled agricultural type, this meridian half-section not being to scale in order to facilitate the understanding thereof. The axes (XX'), (YY') and (ZZ') represent the circumferential, axial and radial directions, respectively. The tread 2, of width A, is connected by way of two sidewalls 3 to two beads 4 that are intended to provide a mechanical connection to a rim 5, of width L. The crown reinforcement 6 is radially on the inside of the tread 2. The carcass reinforcement 7 is radially on the inside of the crown reinforcement 6.

The carcass reinforcement 7 comprises two turned-up carcass layers (71, 72) and two non-turned-up carcass layers (73, 74). Each turned-up carcass layer (71, 72), consisting of mutually parallel reinforcing elements, comprises a main part (711, 721) wrapped, in each bead 4, from the inside of the tire towards the outside around a bead wire 8, of diameter D, so as to form a turn-up (712, 722) of which the end ($E_1$, $E_2$) is positioned radially on the outside of the radially outermost point E of the bead wire 8 at a radial distance ($a_1$, $a_2$). Each non-turned-up carcass layer (73, 74), consisting of mutually parallel reinforcing elements, has an end ($E_3$, $E_4$) which is positioned at a radial distance ($b_3$, $b_4$) from the radially outermost point E of the bead wire 8.

Furthermore, at the sidewalls 3, the two non-turned-up carcass layers (73, 74) are axially on the outside of the main parts (711, 721) of the two turned-up carcass layers (71, 72) and axially on the inside of the turn-ups (712, 722) of the two turned-up carcass layers (71, 72). In addition, in the present case, the end ($E_3$) of the axially outermost non-turned-up carcass layer (73) is interposed between the respective turn-ups (712, 722) of two turned-up carcass layers (71, 72): the non-turned-up carcass layer (73) is said to be sandwiched between the respective turn-ups (712, 722) of the two turned-up carcass layers (71, 72). The end ($E_4$) of the axially innermost non-turned-up carcass layer (74) is, for its part, interposed between the bead wire 8 and the main parts (711, 721) of the two turned-up carcass layers (71, 72).

The meridian section of the tire has, in a meridian plane passing through the rotation axis of the tire, a section height H and a section width S.

In accordance with the invention, the radial distance ($a_1$, $a_2$) between the end ($E_1$, $E_2$) of the turn-up (712, 722) of each turned-up carcass layer (71, 72) and the radially outermost point E of the bead wire 8 is at least equal to 0.5 times the section height H of the tire, and the radial distance ($b_3$, $b_4$) between the end ($E_3$, $E_4$) of each non-turned-up carcass layer (73, 74) and the radially outermost point E of the bead wire 8 is at most equal to the diameter D of the bead wire 8.

Figure 2:
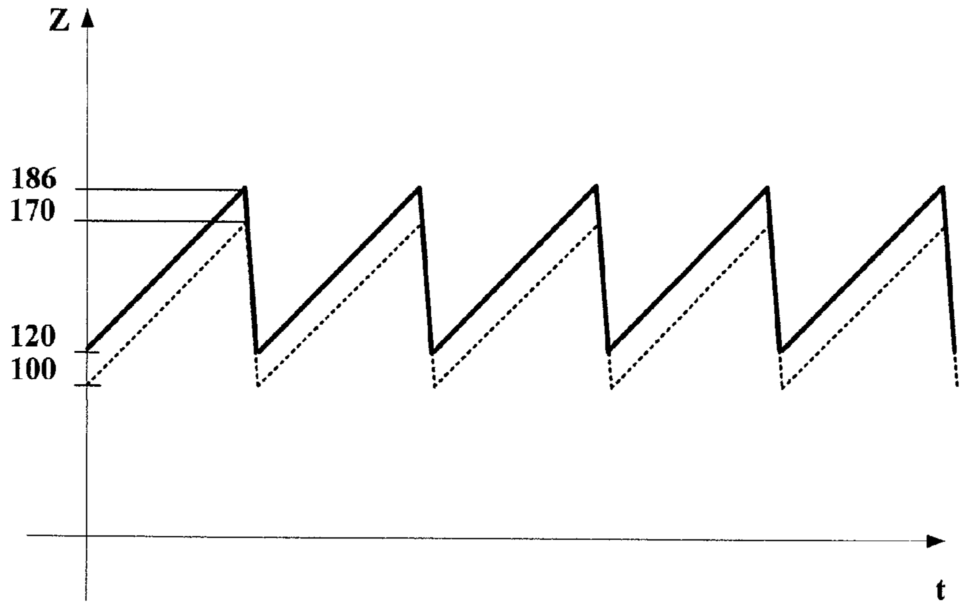
FIG. 2 shows a comparison between the cyclical loads to which a tire according to an embodiment of the invention and a reference tire from the prior art are respectively subjected.

FIG. 2 shows two curves that relate respectively to a tire according to the invention, in solid lines, and a reference tire from the prior art, in dotted lines. Each curve shows the cyclical load to which such a tire fitted on the front axle of a self-propelled agricultural vehicle, such as a combine harvester, is subjected. For a tire of the prior art that is inflated to an inflation pressure equal to 1.15, the recommended inflation pressure, the load is initially equal to the recommended load, corresponding to the index 100, then it increases by 70% to the index 170, while the vehicle moves along in the field and harvests, thereby increasing the load on the tire. When the vehicle offloads its cargo, the load decreases to the initial load at the index 100. Thus, loading and unloading cycles of the tire are observed. In the case of the tire according to the invention, inflated to the recommended inflation pressure, the initial load is increased by 20% compared with the initial load on the tire of the prior art, this corresponding to the index 120, and the maximum load reaches the index 186, i.e. an overload of 86%.

The invention has been studied in particular in the case of a tire for a self-propelled agricultural vehicle of the size 800/70 R 32, of which the theoretical aspect ratio HIS between the section height H and the section width S is equal to 0.70. This tire comprises a carcass reinforcement comprising two turned-up carcass layers and two non-turned-up carcass layers, as described in FIG. 1.

The radial distances ($a_1$, $a_2$) between the ends ($E_1$, $E_2$) of the turn-ups (712, 722) of the turned-up carcass layers (71, 72) and the radially outermost point E of the bead wire 8 are respectively equal to 0.58 times and 0.59 times the section height H of the tire, and thus at least equal to 0.5 times the section height H of the tire. The radial distances ($b_3$, $b_4$) between the respective ends ($E_3$, $E_4$) of the non-turned-up carcass layers (73, 74) and the radially outermost point E of the bead wire 8 are respectively equal to 0.24 times and 0.0005 times the diameter D of the bead wire 8, and thus at most equal to the diameter of the bead wire 8. The reinforcing elements of all the carcass layers (71, 72, 73, 74) are made of polyester.

The tread width A is equal to 13.35 times the crown deflection B, and thus at most equal to 20 times and at least equal to 10 times the crown deflection B. The section width S of the tire is equal to 1.17 times the rim width L, and thus at most equal to 1.4 times and at least equal to 1.1 times the rim width L. The tread width A is equal to 0.88 times the section width S of the tire, and thus at most equal to 0.95 times and at least equal to 0.75 times the section width S of the tire.

The tests carried out on a tire of the size 800/70 R 32 according to the invention, as characterized above, have shown that the endurance of the carcass reinforcement of this tire, subjected to cyclical loads of between 1.2 times and 1.86 times the recommended load capacity of the reference tire, for a pressure equal to the pressure of the reference tire, was at the same level as that of the carcass reinforcement of the reference tire, subjected to cyclical loads of between 1 and 1.70 times the recommended load capacity of the reference tire, for a pressure equal to 1.16 times the pressure of the reference tire.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for a heavy vehicle of a self-propelled agricultural type, comprising:

a tread, of width A, connected by way of two sidewalls to two beads configured to provide a mechanical connection to a rim, of width L;

a reinforcement comprising a crown reinforcement, radially on an inside of the tread, and a carcass reinforcement, radially on the inside of the crown reinforcement;

wherein the carcass reinforcement comprises at least two turned-up carcass layers and at least two non-turned-up carcass layers;

wherein each said turned-up carcass layer includes mutually parallel reinforcing elements and comprises a main part wrapped, in each said bead, from the inside of the tire towards an outside around a bead wire, of diameter D, so as to form a turn-up of which an end is positioned radially on the outside of a radially outermost point of the bead wire at a radial distance;

wherein each said non-turned-up carcass layer includes mutually parallel reinforcing elements, an end of which is positioned at a radial distance from the radially outermost point of the bead wire, and each non-turned-up carcass layer is not wrapped around any portion of any bead wire;

wherein a meridian section of the tire has, in a meridian plane passing through a rotation axis of the tire, a section height H and a section width S;

wherein, in each sidewall portion of the tire, a sequence of carcass layers from the outside of the tire to the inside of the tire comprises a turn-up of a first turned-up carcass layer, a first non-turned-up carcass layer, a turn-up of a second turned-up carcass layer, a second non-turned-up carcass layer, a main portion of the second turned-up carcass layer, and a main portion of the first turned-up carcass layer;

wherein the radial distance between the end of the turn-up of each turned-up carcass layer and the radially outermost point of the bead wire is at least equal to 0.5 times the section height H of the tire, and wherein the radial distance between the end of each non-turned-up carcass layer and the radially outermost point of the bead wire is at most equal to the diameter D of the bead wire.

2. The tire according to claim 1, wherein the radial distance between the end of the turn-up of each turned-up carcass layer and the radially outermost point of the bead wire is at most equal to 0.85 times the section height H of the tire.

3. The tire according to claim 1, wherein the reinforcing elements of at least one of the carcass layers is made of textile.

4. The tire according to claim 1, wherein the reinforcing elements of at least one of the carcass layers is made of polyester.

5. The tire according to claim 1, wherein the meridian section of the tire has a crown deflection B, and the tread width A is at most equal to 20 times the crown deflection B.

6. The tire according to claim 1, wherein the meridian section of the tire has a crown deflection B, and the tread width A is at least equal to 10 times the crown deflection B.

7. The tire according to claim 1, wherein the section width S of the tire is at most equal to 1.4 times the rim width L.

8. The tire according to claim 1, wherein the section width S of the tire is at least equal to 1.1 times the rim width L.

9. The tire according to claim 1, wherein the tread width A is at most equal to 0.95 times the section width S of the tire.

10. The tire according to claim 1, wherein the tread width A is at least equal to 0.75 times the section width S of the tire.

11. The tire according to claim 1, wherein the tread width A is at most equal to 16 times a crown deflection B.

* * * * *